United States Patent
Miki et al.

(10) Patent No.: US 11,097,799 B2
(45) Date of Patent: Aug. 24, 2021

(54) SADDLED VEHICLE

(71) Applicant: HONDA MOTOR CO., LTD., Tokyo (JP)

(72) Inventors: Sosuke Miki, Asaka (JP); Jun Tanaka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 236 days.

(21) Appl. No.: 16/381,775

(22) Filed: Apr. 11, 2019

(65) Prior Publication Data

US 2019/0329833 A1 Oct. 31, 2019

(30) Foreign Application Priority Data

Apr. 26, 2018 (JP) .............................. JP2018-085330

(51) Int. Cl.
 *B62J 17/00* (2020.01)
 *B62J 17/10* (2020.01)
 (Continued)

(52) U.S. Cl.
 CPC ................. *B62J 1/02* (2013.01); *B62J 17/00* (2013.01); *B62J 17/10* (2020.02); *B62J 35/00* (2013.01)

(58) Field of Classification Search
 CPC ............ B62J 17/00; B62J 17/10; B62J 17/02
 See application file for complete search history.

(56) References Cited

U.S. PATENT DOCUMENTS

| D597,458 S | * | 8/2009 | Takigawa | ...................... D12/126 |
| 8,631,888 B2 | * | 1/2014 | Iida | .......................... B62J 17/00 180/68.1 |

(Continued)

FOREIGN PATENT DOCUMENTS

| JP | 64-41486 A | 2/1989 |
| JP | 4-201792 A | 7/1992 |
| JP | 2006-213249 A | 8/2006 |
| JP | 2006-281949 A | 10/2006 |

(Continued)

OTHER PUBLICATIONS

Japanese Office Action, dated Oct. 23, 2019, for Japanese Application No. 2018-085330, with an English Translation.

(Continued)

*Primary Examiner* — Minnah L Seoh
*Assistant Examiner* — Michael R Stabley
(74) *Attorney, Agent, or Firm* — Birch, Stewart, Kolasch & Birch LLP

(57) ABSTRACT

A wing member includes a first wing, a second wing, and a connection section connecting one-end sides of the first wing and the second wing. Both the wings are disposed with a spacing therebetween in the longitudinal vehicle direction, and the first wing is located on a vehicle body front upper side relative to the second wing. The connection section connects the one-end sides of both the wings that extend from a cowling toward a transverse-directionally outer side. A front edge of the first wing is inclined such that its transverse-directionally outer side portion is located on the vehicle body rear side relative to its transverse-directionally inner side portion, in plan view of the vehicle body. A rear edge of the first wing is inclined such that its transverse-directionally outer side portion is located on the vehicle body front side relative to its transverse-directionally inner side portion, in plan view.

14 Claims, 14 Drawing Sheets

(51) Int. Cl.
*B62J 1/02* (2006.01)
*B62J 35/00* (2006.01)

(56) References Cited

U.S. PATENT DOCUMENTS

| | | | |
|---|---|---|---|
| 8,678,413 B2* | 3/2014 | Takasu | B62J 17/00 |
| | | | 280/219 |
| 9,346,507 B2* | 5/2016 | Hoashi | B62J 6/02 |
| 9,676,442 B1 | 6/2017 | Li | |
| 2006/0219450 A1 | 10/2006 | Misaki et al. | |
| 2007/0024089 A1 | 2/2007 | Takeshita | |
| 2012/0043160 A1 | 2/2012 | Miyazaki et al. | |
| 2015/0274001 A1 | 10/2015 | Hosoya et al. | |
| 2016/0016623 A1 | 1/2016 | Ishii et al. | |
| 2017/0057583 A1* | 3/2017 | Yokoyama | B62K 5/027 |
| 2017/0282748 A1* | 10/2017 | Yamamoto | B60L 58/33 |

FOREIGN PATENT DOCUMENTS

| | | |
|---|---|---|
| JP | 2012-162094 A | 8/2012 |
| WO | WO 2015/049654 A1 | 4/2015 |

OTHER PUBLICATIONS

Indian Office Action for Indian Application No. 241914015880, dated Dec. 16, 2020, with Engiish translation.
Anonymous, "Winglets on Ducati GP10 | automotive news | robotpig.net," automotive news, Jul. 18, 2010, XP055375594, 3 pages, (Retrieved from the Internet on May 23, 2017).
Extended European Search Report, dated Sep. 25, 2019, for European Application No. 19170453.5.

* cited by examiner

SADDLED VEHICLE

TECHNICAL FIELD

The present invention relates to a saddled vehicle, particularly to a saddled vehicle having a cowling as an exterior part that covers the front side and the lateral sides of a vehicle body.

BACKGROUND ART

Conventionally, in a saddled vehicle having a cowling as an exterior part that covers the front side and the lateral sides of the vehicle body, a configuration has been known in which a plate-shaped wing member is attached to a surface of the cowling, for rectifying airflow (induced by travelling of the vehicle) into a desired direction and for obtaining a down force that presses down the vehicle body.

Patent Document 1 discloses a configuration in which, in a motorcycle including a main cowl covering the front side and lateral sides of a vehicle body and a seat cowl disposed on the rear side of a seat, a pair of left and right front-side wing members are provided at lateral sides of the main cowl, whereas a pair of left and right rear-side wing members are provided on lateral sides of the seat cowl, and, thus, the vehicle body exterior part is provided with a plurality of wing members.

CITATION LIST

Patent Literature

Patent Document 1: JP H04-201792 A

SUMMARY OF INVENTION

Technical Problem

However, the wing members disclosed in Patent Document 1 are of a cantilever type in which only one end portion of the wing member is supported by the cowling. Therefore, when a force acting on the wing member due to the airflow increases, deformation or vibration on the tip side of the wing member may be generated. In addition, the force acting on the wing member increases as the wing member is enlarged.

It is an object of the present invention to solve the above-mentioned problem in the related art, and to provide a saddled vehicle having a wing member in which deformation or vibration due to airflow is not liable to be generated and an aerodynamic effect such as a down force can be enhanced.

Solution to Problems

To achieve the afore-mentioned object, the present invention has a first feature in that a saddled vehicle comprising a cowling covering a front side and lateral sides of a vehicle body, and a wing member (40) attached to an outer side of the cowling (10,28), wherein the wing member (40) includes a first wing (50), a second wing (60), and a connection section (43) connecting one-end sides of the first wing (50) and the second wing (60), the first wing (50) and the second wing (60) are disposed with a spacing therebetween in a longitudinal vehicle direction, the first wing (50) is located on a vehicle body front upper side relative to the second wing (60), the connection section (43) connects the one-end sides of the first wing (50) and the second wing (60) that extend from the cowling toward a transverse-directionally outer side, a front edge (50f) of the first wing (50) is inclined such that its transverse-directionally outer side portion is located on a vehicle body rear side relative to its transverse-directionally inner side portion, in plan view of the vehicle body, and a rear edge (50r) of the first wing (50) is inclined such that its transverse-directionally outer side portion is located on a vehicle body front side relative to its transverse-directionally inner side portion, in plan view of the vehicle body.

The present invention has a second feature in that the connection section (43) is used as an attachment section attaching other part (70).

The present invention has a third feature in that the other part (70) is a cover member (70) extending toward a vehicle body rear lower side while covering the connection section (43) and the second wing (60) in side view of the vehicle body, an upper end portion (71) of the cover member (70) is attached to the connection section (43), and a lower end portion (72) of the cover member (70) is attached to the cowling (28) at a position on a vehicle body lower side of the second wing (60).

The present invention has a fourth feature in that a transverse-directionally inner side surface of the connection section (43) is provided with a bulging portion (81) for embedding a fixing member (82) for fixing the cover member (70).

The present invention has a fifth feature in that the cowling (28) covers at least transverse-directionally outer sides of an engine (E) and a radiator (39) disposed on a vehicle body front side of the engine (E), the cowling (28) is formed with an exhaust opening (35) for exhausting airflow having passed through the radiator (39) to a transverse-directionally outer side of the cowling (28), and the cover member (70) is disposed on a vehicle body front side of the exhaust opening (35).

The present invention has a sixth feature in that the wing member (40) is provided as a pair of left and right wing members (40) in the transverse direction, the front edge (50f) of the first wing (50) is inclined such that its transverse-directionally outer side portion is located on a vehicle body lower side relative to its transverse-directionally inner side portion, in front view of the vehicle body, and a front edge (600 of the second wing (60) is oriented in a substantially horizontal direction in front view of the vehicle body.

The present invention has a seventh feature in that the front edge (50f) of the first wing (50) has a shape along an arc (D) of a circle having a center at a grounding point (O) of a front wheel (WF) of the saddled vehicle (1), in front view of the vehicle body.

The present invention has an eighth feature in that a transverse directional size (W1) of the first wing (50) is greater than a transverse directional size (W2) of the second wing (60), and a longitudinal vehicle directional size (L1) of the first wing (50) is greater than a longitudinal vehicle directional size (L2) of the second wing (60).

The present invention has a ninth feature in that the cowling includes a front cowl (10) covering a vehicle body front side, and a pair of left and right side cowls (28) connected to a rear end portion of the front cowl (10), and a front-side attachment section (41) provided on an other end side of the first wing (50) is attached to the front cowl (10), and a rear-side attachment section (42) provided on an other end side of the second wing (60) is attached to the side cowl (28).

The present invention has a tenth feature in that the front edge (50f) of the first wing (50) is located on a vehicle body lower side relative to a lower edge (10a) of the front cowl (10), in side view of the vehicle body.

The present invention has an eleventh feature in that an intake opening (12) for guiding in airflow is formed at a vehicle body front side end portion of the front cowl (10), and the front edge (50f) of the first wing (50) is along an extension line of a lower edge (12a) of the intake opening (12), in front view of the vehicle body.

Effects of the Invention

According to the first feature, a saddled vehicle comprising a cowling covering a front side and lateral sides of a vehicle body, and a wing member (40) attached to an outer side of the cowling (10,28), wherein the wing member (40) includes a first wing (50), a second wing (60), and a connection section (43) connecting one-end sides of the first wing (50) and the second wing (60), the first wing (50) and the second wing (60) are disposed with a spacing therebetween in a longitudinal vehicle direction, the first wing (50) is located on a vehicle body front upper side relative to the second wing (60), the connection section (43) connects the one-end sides of the first wing (50) and the second wing (60) that extend from the cowling toward a transverse-directionally outer side, a front edge (50f) of the first wing (50) is inclined such that its transverse-directionally outer side portion is located on a vehicle body rear side relative to its transverse-directionally inner side portion, in plan view of the vehicle body, and a rear edge (50r) of the first wing (50) is inclined such that its transverse-directionally outer side portion is located on a vehicle body front side relative to its transverse-directionally inner side portion, in plan view of the vehicle body. Therefore, in the configuration in which the cowling is provided with a plurality of wings, one-end sides of the first wing as a main wing and the second wing as a sub-wing are connected to each other, whereby the rigidity of the parts as single bodies and the support strength onto the cowling can be enhanced, and generation of deformation or vibration of the wings can be prevented. In addition, since the one-end sides of the first wing and the second wing which are disposed to be deviated from each other in the longitudinal vehicle direction and in the vertical direction are connected by the connection section, the connection section is disposed in the state of being inclined rearwardly downward; therefore, the effect to rectify the airflow and reduce air resistance can be enhanced.

In addition, the wings are spaced from each other in the longitudinal vehicle direction, and the second wing on the vehicle body rear side is located below the first wing. Therefore, in the case where a rearwardly upward angle is given to the upper surfaces of the wings for obtaining a down force, the airflow making contact with the second wing is not liable to be influenced by the rectification by the first wing, and a high down force effect can be obtained by both the first wing and the second wing.

Further, the front edge of the first wing is inclined rearwardly and the rear edge of the first wing is inclined forwardly, whereby it is possible to enlarge the longitudinal vehicle directional length and the surface area of the first wing, and to enhance the aerodynamic effect, as compared to a shape in which the front edge and the rear edge are parallel to each other. Besides, it becomes easier to enlarge the areas of the parts connected to the cowling, and support rigidity of the wings can be enhanced.

According to the second feature, the connection section (43) is used as an attachment section attaching other part (70). Therefore, the other part can be attached by utilizing the connection section that connects the first wing and the second wing. This makes it possible to omit a special-purpose stay for attaching the other part, and to reduce the number of component parts.

According to the third feature, the other part (70) is a cover member (70) extending toward a vehicle body rear lower side while covering the connection section (43) and the second wing (60) in side view of the vehicle body, an upper end portion (71) of the cover member (70) is attached to the connection section (43), and a lower end portion (72) of the cover member (70) is attached to the cowling (28) at a position on a vehicle body lower side of the second wing (60). Therefore, the presence of the cover member permits the airflow passing under the second wing to be rectified toward the vehicle body rear side. In addition, with the upper end portion of the cover member attached to the wing member, it is unnecessary to provide a special-purpose attachment stay or the like, and the number of component parts can be reduced.

According to the fourth feature, a transverse-directionally inner side surface of the connection section (43) is provided with a bulging portion (81) for embedding a fixing member (82) for fixing the cover member (70). Therefore, it is possible to restrain disturbance or air resistance of the airflow passing along the inner side surface of the connection section, as compared to a configuration in which the fastening member is exposed at the transverse-directionally inner side surface of the connection section.

According to the fifth feature, the cowling (28) covers at least transverse-directionally outer sides of an engine (E) and a radiator (39) disposed on a vehicle body front side of the engine (E), the cowling (28) is formed with an exhaust opening (35) for exhausting airflow having passed through the radiator (39) to a transverse-directionally outer side of the cowling (28), and the cover member (70) is disposed on a vehicle body front side of the exhaust opening (35). Therefore, the airflow which is unable to pass through the radiator located in the transverse directional center but is changed in flowing course toward the transverse-directionally outer side to pass on the outer side of the cowling can be rectified by the cover member to flow smoothly toward the vehicle body rear side. In addition, with the cover member disposed on the vehicle body front side of the exhaust opening, the airflow rectified by the cover member joins the airflow exhausted via the exhaust opening, to flow smoothly toward the vehicle body rear side.

According to the sixth feature, the wing member (40) is provided as a pair of left and right wing members (40) in the transverse direction, the front edge (50f) of the first wing (50) is inclined such that its transverse-directionally outer side portion is located on a vehicle body lower side relative to its transverse-directionally inner side portion, in front view of the vehicle body, and a front edge (60f) of the second wing (60) is oriented in a substantially horizontal direction in front view of the vehicle body. Therefore, by providing the first wing with a cathedral angle of a wing of an airplane, a force in a direction for further deepening a bank angle can be obtained when the saddled vehicle banks for cornering. On the other hand, by setting the cathedral angle given to the second wing to roughly zero, only the function of increasing the down force can be obtained.

According to the seventh feature, the front edge (50f) of the first wing (50) has a shape along an arc (D) of a circle having a center at a grounding point (O) of a front wheel (WF) of the saddled vehicle (1), in front view of the vehicle body. Therefore, it is possible to reduce air resistance generated by the first wing when the vehicle body is banked to the left or the right. As a result, a resistance feeling due to air resistance is not liable to be generated even in the case where the speed of banking to the left or the right is high.

According to the eighth feature, a transverse directional size (W1) of the first wing (50) is greater than a transverse directional size (W2) of the second wing (60), and a longitudinal vehicle directional size (L1) of the first wing (50) is greater than a longitudinal vehicle directional size (L2) of the second wing (60). Therefore, the aerodynamic effect can be enhanced by enlarging the first wing located on the vehicle body front side. Besides, in a case where the cowling to which to attach the wing members has such a shape as to be increased in the transverse directional size in going rearward from the vehicle body front side end portion, the first wing is formed in conformity with the shape of the cowling. Consequently, it is possible to reduce the amount of projection of the wing member to the transverse-directionally outer side while obtaining a sufficient aerodynamic effect.

According to the ninth feature, the cowling includes a front cowl (10) covering a vehicle body front side, and a pair of left and right side cowls (28) connected to a rear end portion of the front cowl (10), and a front-side attachment section (41) provided on an other end side of the first wing (50) is attached to the front cowl (10), and a rear-side attachment section (42) provided on an other end side of the second wing (60) is attached to the side cowl (28). Therefore, with the wing member attached in a crossing manner between the front cowl and the side cowl, it is possible to enhance the joint rigidity between the front cowl and the side cowl. In addition, since the cowling is divided into front and rear portions, maintainability can be enhanced.

According to the tenth feature, the front edge (50f) of the first wing (50) is located on a vehicle body lower side relative to a lower edge (10a) of the front cowl (10), in side view of the vehicle body. Therefore, the airflow before making contact with the front cowl is received by the first wing, whereby the aerodynamic effect such as a down force can be further enhanced.

According to the eleventh feature, an intake opening (12) for guiding in airflow is formed at a vehicle body front side end portion of the front cowl (10), and the front edge (50f) of the first wing (50) is along an extension line of a lower edge (12a) of the intake opening (12), in front view of the vehicle body. Therefore, where the edge portion that divides the airflow from the vehicle body front side into upper and lower portions is formed integrally over the range from a lower edge of the exhaust opening to the front edge of the first wing, it is thereby possible to restrain disturbance of the airflow.

DESCRIPTION OF EMBODIMENTS

Figure 1:
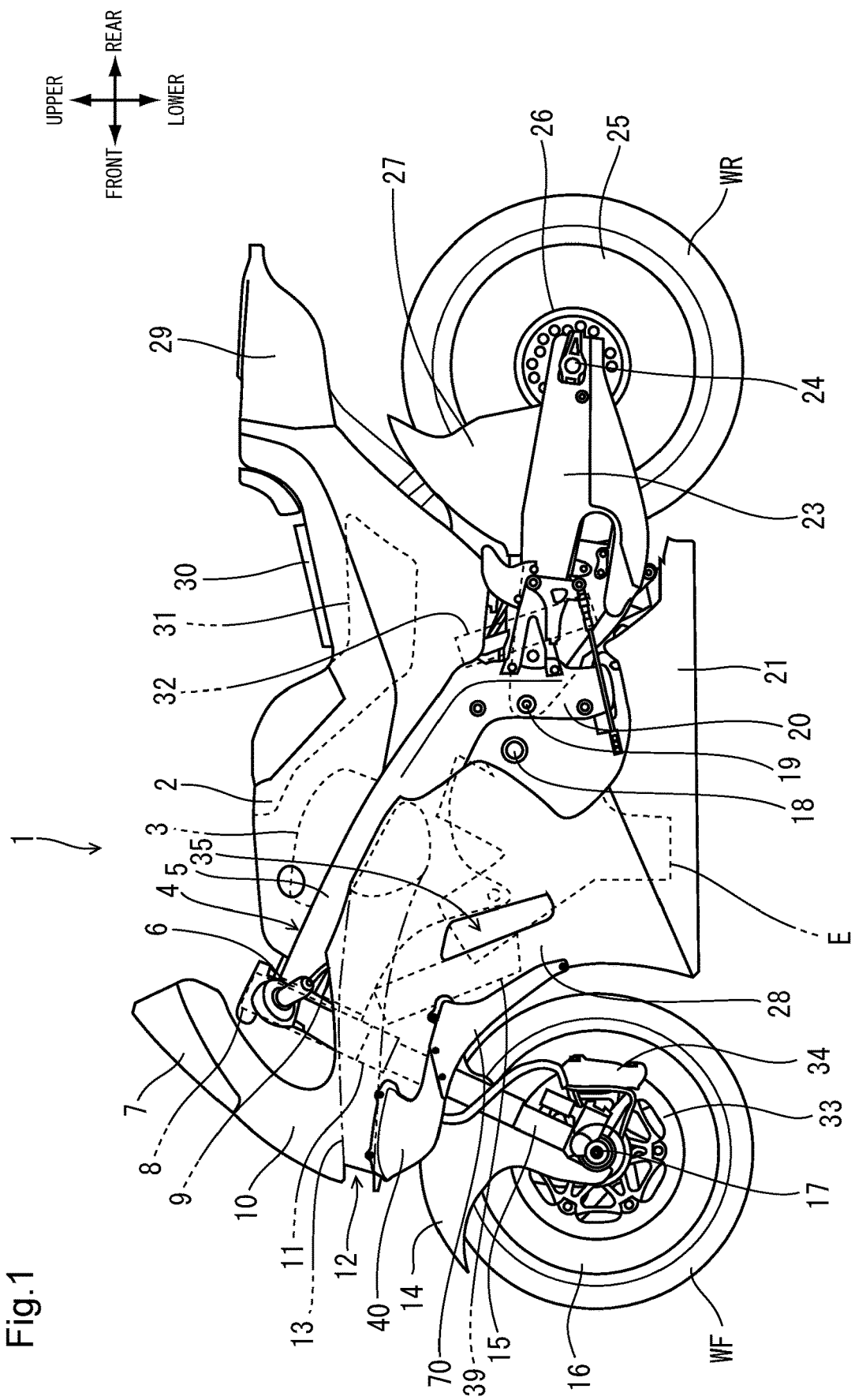
FIG. 1 is a left side view of a motorcycle according to one embodiment of the present invention.
Figure 2:
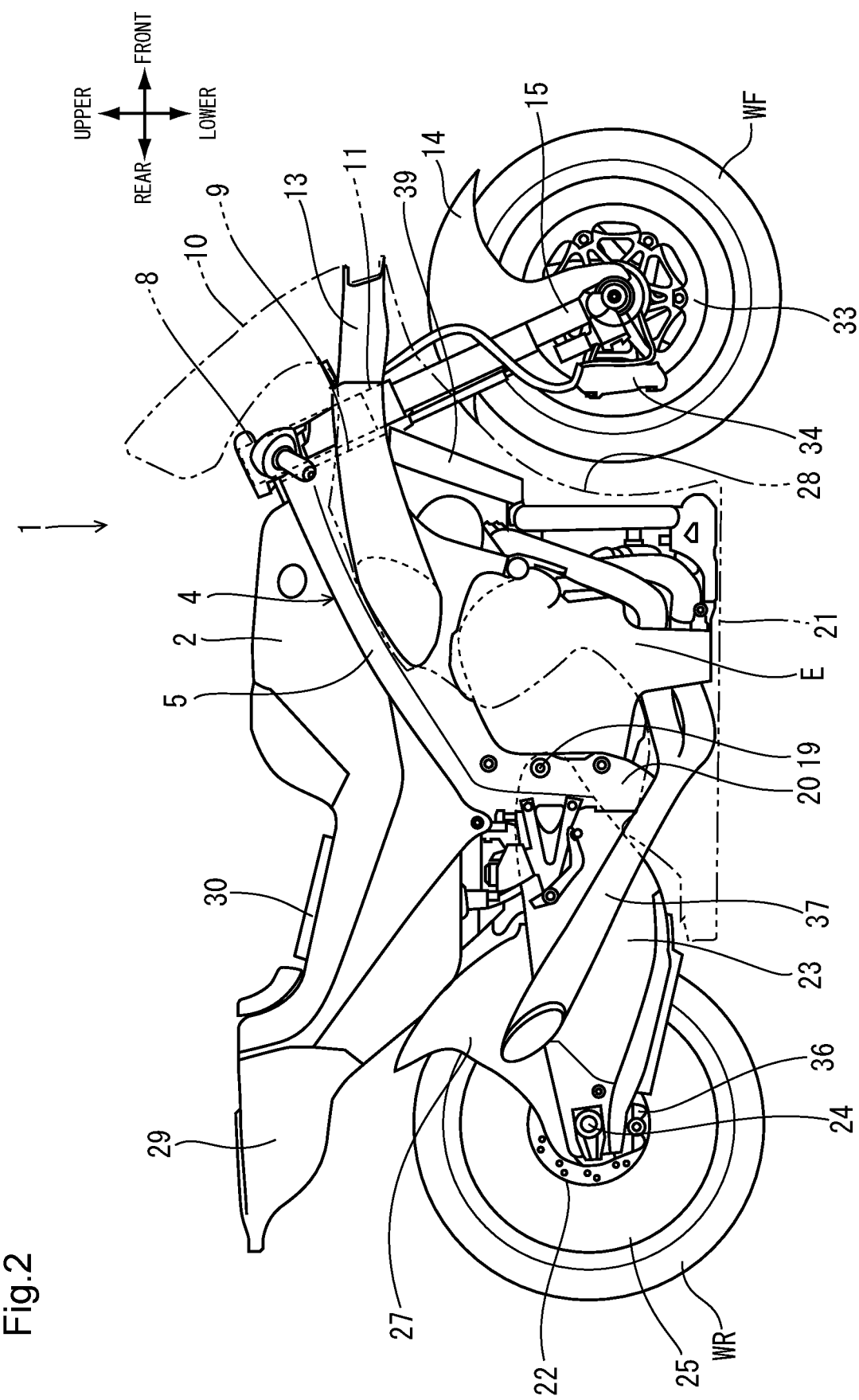
FIG. 2 is a right side view of the motorcycle.
Figure 3:
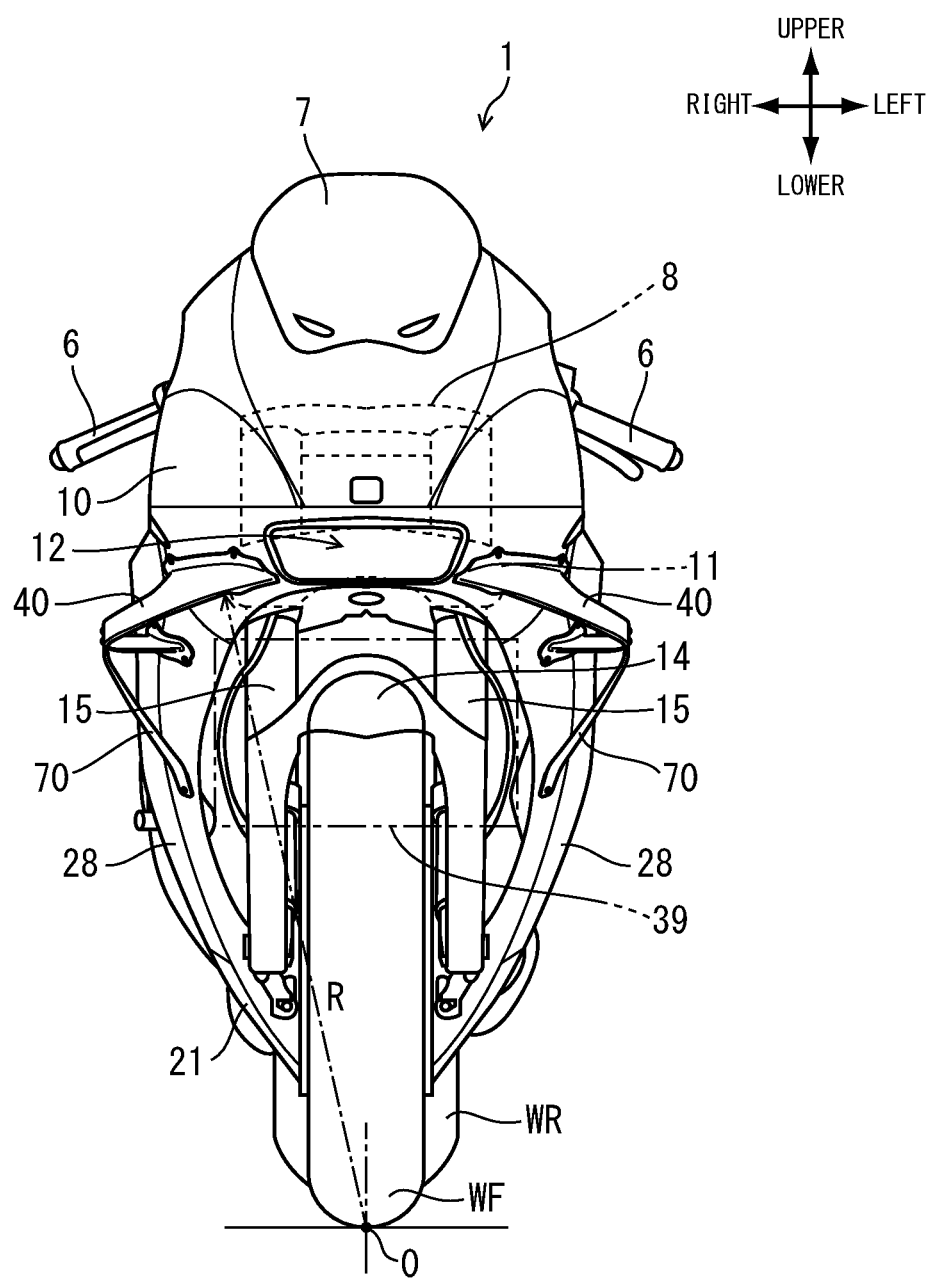
FIG. 3 is a front view of the motorcycle.

A preferred embodiment of the present invention will be described in detail below, referring to the drawings. FIG. 1 is a left side view of a motorcycle 1 according to one embodiment of the present invention. In addition, FIG. 2 is a right side view of the same, and FIG. 3 is a front view of the same. A body frame 4 of the motorcycle 1 as a saddled vehicle has a pair of left and right main frames 5 extending from a head pipe 9 toward the vehicle body rear side. A steering system for a front wheel WF swingably shaft-supported by the head pipe 9 includes a pair of left and right front forks 15 that shaft-supports the front wheel WF by an axle 17, a top bridge 8 and a bottom bridge 11 that clamp the front forks 15 on the upper and lower sides of the head pipe 9, and a steering stem (not illustrated) that connects the top bridge 8 and the bottom bridge 11 to each other and that is shaft-supported by the head pipe 9. A pair of left and right brake disks 33 are fixed to a wheel 16 of the front wheel WF, and the brake disks 33 together with a front brake caliper 34 fixed to the front fork 15 constitute a hydraulic brake system on the front wheel WF side. A steering handle 6 is fixed to upper portions of the front forks 15.

A pair of left and right pivot plates 20 supporting a pivot 19 by which a swing arm 23 is swingably shaft-supported are connected to rear lower portions of the main frames 5, and a four-cycle V-type four-cylinder engine E is fixed to lower portions of the main frames 5. Combustion gas of the engine E is guided through an exhaust pipe to a muffler 37 on the transverse-directionally right side. A driving force of the engine E is transmitted to a rear wheel WR rotatably shaft-supported on a rear end of the swing arm 23 by an axle 24.

A front cowl 10 having a windscreen 7 is disposed on the front side of the head pipe 9. A pair of left and right side cowls 28 covering the lateral sides of the vehicle body are connected to rear portions of the front cowl 10 covering the front side of the vehicle body, at joint lines 38, and an under cowl 21 covering a lower portion of the engine E is connected to lower end portions of the side cowls 28.

A front fender 14 covering an upper portion of the front wheel WF is fixed to the front forks 15. A tank cover 2 covering a fuel tank 31 and an upper portion of an air cleaner box 3 is attached to upper portions of the main frames 5. A rear cowl 29 is disposed on the rear side of a seat 30 attached to the tank cover 2, and a rear fender 27 covering an upper portion of the rear wheel WR is fixed to an upper portion of the swing arm 23.

A driving force outputted from an output shaft 18 of the engine E is transmitted through a drive chain (not illustrated) to a driven sprocket 26 fixed to a transverse-directionally left side of a wheel 25 of the rear wheel WR. A brake disk 22 is fixed to a transverse-directionally right side of the wheel 25 of the rear wheel WR, and the brake disk 22 and a rear brake caliper 36 disposed on the lower side of the swing arm 23 constitute a hydraulic brake system on the rear wheel WR side. The swing arm 23 is suspended from the body frame 4 by a rear cushion 32 disposed on the rear side of the pivot 19.

A pair of left and right air duct 13 that guide air to a lower portion of the air cleaner box 3 are disposed on transverse-directionally outer sides of the main frames 5. The air ducts 13 are passed on the transverse-directionally outer sides of the front forks 15, are then collected on the front side of the head pipe 9, and connected to an intake opening 12 provided in the transverse directional center of the front cowl 10. A radiator 39 is disposed on the vehicle body front side of the engine E. An exhaust opening 35 formed in a side surface of the side cowl 28 is disposed on the rear side of the radiator 39 in side view of the vehicle body.

In the motorcycle 1 according to the present embodiment, pairs of left and right wing members 40 and cover members 70 are attached to a surface of a cowling (the front cowl 10 and the side cowls 28) on the transverse-directionally outer sides of the front forks 15. The wing members 40 and the cover members 70 formed from a fiber reinforced resin or the like have a function of receiving airflow and generating a down force for pressing down the vehicle body and a function of rectifying the airflow passing along the surfaces of the front cowl 10 and the side cowl 28. As depicted in FIG. 3, front edges of the wing members 40 are formed to roughly follow an arc of a circle having a radius R and having a center at a grounding point O of the front wheel WF, in front view of the vehicle body.

Figure 4:
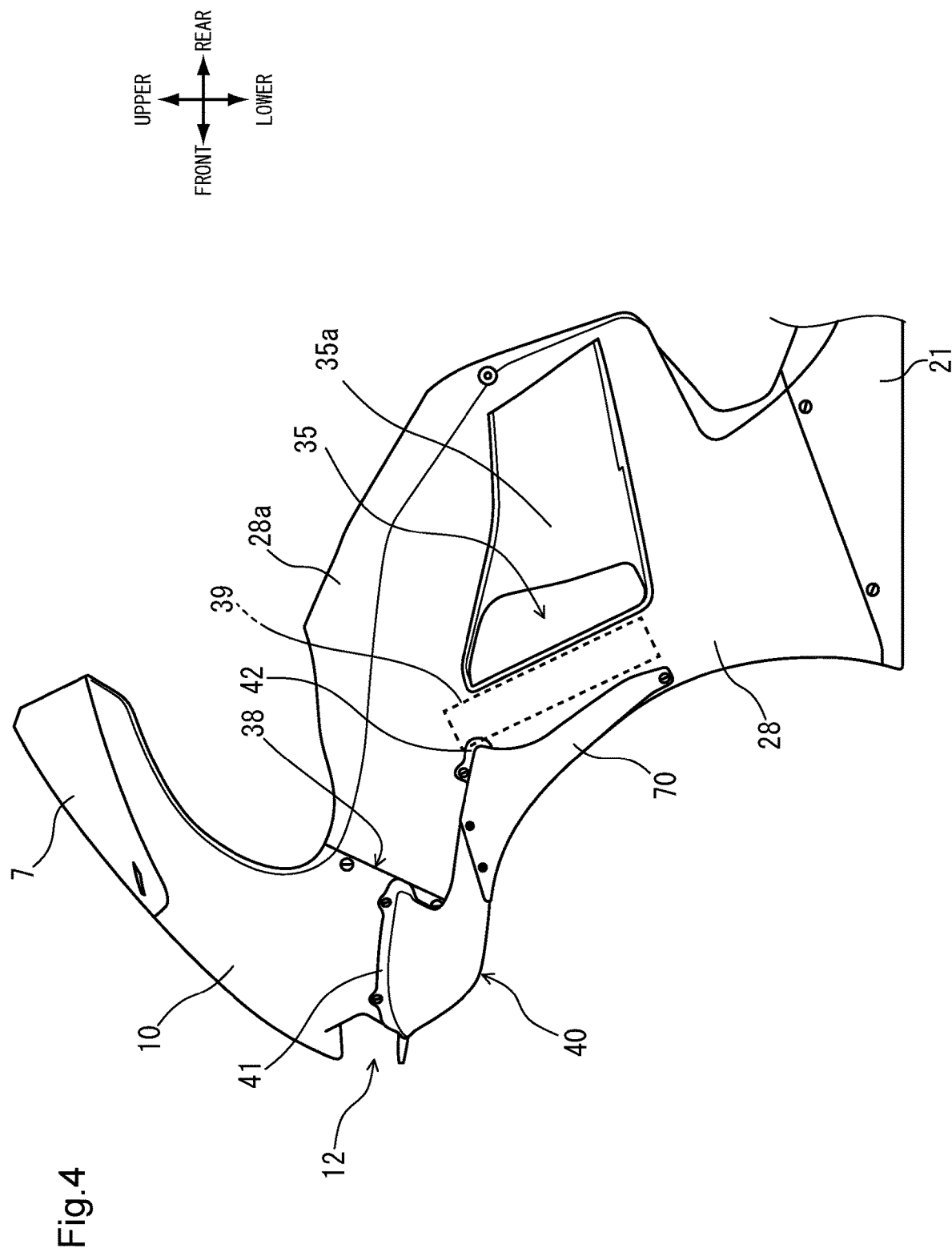
FIG. 4 is a left side view of the front cowl and the side cowls.
Figure 5:
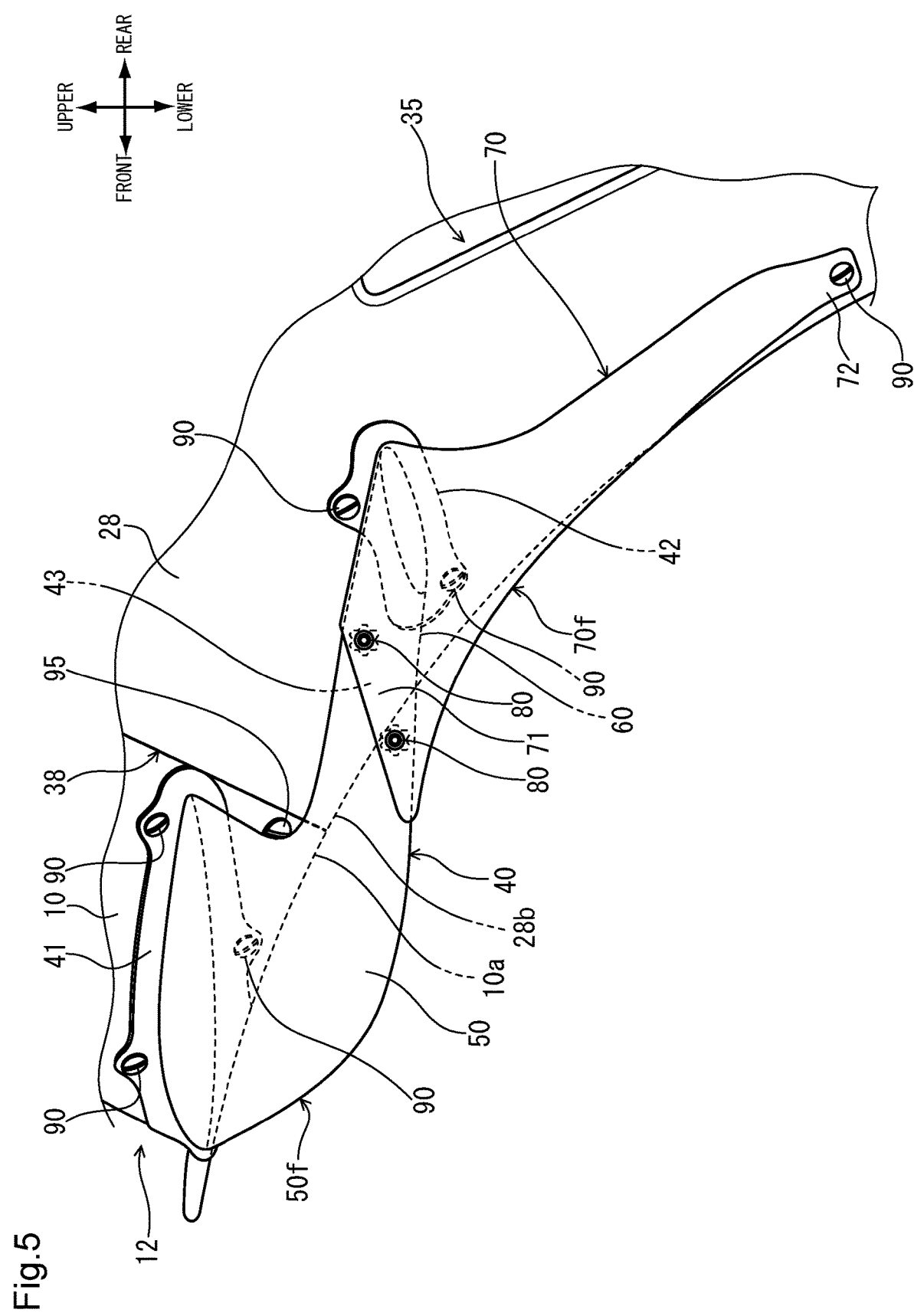
FIG. 5 is an enlarged left side view illustrating the wing member and its peripheral structure.

FIG. 4 is a left side view of the front cowl 10 and the side cowls 28. In addition, FIG. 5 is an enlarged left side view illustrating the wing member 40 and its peripheral structure. The wing member 40 curved in an arch shape as a whole while having an airfoil section at least a part thereof is an integral part that is attached to a side surface of the front cowl 10 by a front-side attachment section 41 on the vehicle body front side and is attached to a side surface of the side cowl 28 by a rear-side attachment section 42 on the vehicle body rear side. An upper surface portion 28a where a flat surface portion is oriented to the vehicle body upper side is provided at an upper end portion of the side cowl 28.

Each of the cover members 70 has its upper end portion fixed to a transverse-directionally outer side surface of the wing member 40, and has its lower end portion fixed to the side cowl 28. Airflow warmed by passing through the radiator 39 is exhausted through the exhaust opening 35 provided in the side cowl 28. An inclined surface 35a by which the exhaust angle of the airflow in the transverse direction is moderated and the airflow is caused to flow smoothly toward the vehicle body rear side is formed on the rear side of the exhaust opening 35.

Referring to FIG. 5, the wing member 40 has a configuration in which a first wing (main wing) 50 extending toward the transverse-directionally outer side from the front-side attachment section 41 attached to the front cowl 10 and a second wing (sub-wing) 60 extending toward the transverse-directionally outer side from the rear-side attachment section 42 located on the vehicle body rear lower side of the front-side attachment section 41 are connected to each other by a connection section 43.

More specifically, the wing member 40 includes the first wing 50, the second wing 60, and the connection section 43 that connects one-end sides of the first wing 50 and the second wing 60. The first wing 50 and the second wing 60 are disposed with a spacing therebetween in the longitudinal vehicle direction, the first wing 50 is located on the vehicle body front upper side relative to the second wing 60, and the connection section 43 connects the one-end sides of the first wing 50 and the second wing 60 which extend toward the transverse-directionally outer side from the cowlings 10 and 28. This ensures that in a configuration in which a cowling is provided with a plurality of wings, the one-end sides of the first wing 50 as the main wing and the second wing 60 as the sub-wing are connected, whereby the rigidity of the wing member 40 and the support strength onto the cowling can be enhanced, and the wings 50 and 60 can be prevented from being deformed or vibrated.

In addition, since the connection section connects the one-end sides of the first wing 50 and the second wing 60 which are disposed to be deviated from each other in the longitudinal vehicle direction and in the vertical direction, the connection section is disposed to be inclined rearwardly downward, whereby an effect to rectify the airflow and reduce air resistance is enhanced. Further, since the wings are spaced from each other in the longitudinal vehicle direction and the second wing 60 on the vehicle body rear side is located below the first wing 50, it is ensured that in the case of giving a rearwardly upward angle to the upper surfaces of the wings 50 and 60 for obtaining a down force, the airflow making contact with the second wing 60 is not liable to be influenced by the rectification by the first wing 50, and a high down force effect can be obtained at both the first wing 50 and the second wing 60.

In other words, the wing member 40 is configured by connecting the first wing 50 and the second wing 60 by the connection section 43, and the cowling is attached at the two locations of the front-side attachment section 41 and the rear-side attachment section 42. This makes it possible to enhance the rigidity of the wing member 40 and the support strength onto the cowling, to prevent generation of deformation or vibration of the wing member 40, and to obtain an aerodynamic effect such as a down force by both the first wing 50 and the second wing 60, as compared to a cantilever system in which only an end portion on one side is attached to the cowling. Of the wing member 40, part or the whole of the first wing 50 and the second wing 60 is a hollow or solid structure in a roughly airfoil sectional shape bulging at a central portion, and the connection section 43 is in a flat plate shape.

The front-side attachment section 41 and the rear-side attachment section 42 which are in a thin sheet-like flange shape are fixed to the front cowl 10 and the side cowls 28 by a quick fastener mechanism using a lock member 90 having a round plate-like head portion.

A front edge 50f of the first wing 50 is located on the vehicle body lower side than the lower edge 10a of the front cowl 10, in side view of the vehicle body. This ensures that the airflow before making contact with the front cowl 10 is received by the first wing 50, whereby an aerodynamic effect such as a down force can be enhanced.

The cover member 70 is a thin sheet-shaped member extending toward the vehicle body rear lower side while covering the connection section 43 and the second wing 60, in side view of the vehicle body. The presence of the cover member 70 permits the airflow passing under the second wing 60 to be rectified toward the vehicle body rear side. An upper end portion 71 of the cover member 70 is fixed to a transverse-directionally outer side surface of the connection section 43 by use of fastening members 80 such as screws. On the other hand, a lower end portion 72 of the cover member 70 is fixed to the front cowl 10 and the side cowl 28 by a quick fastener mechanism using the lock member 90.

Thus, the connection section 43 of the wing member 40 is used as an attachment section attaching the cover member 70. Therefore, it is possible to omit a special-purpose stay for attaching the cover member 70, and thereby to reduce the number of component parts. The front cowl 10 and the side cowl 28 joined to each other at the joint line 38 are fixed together by a quick fastener mechanism using a lock member 95.

As above-mentioned, the exhaust opening 35 formed in the side cowl 28 is located on the vehicle body rear side of the radiator 39. Correspondingly to this, the cover member 70 is located on the vehicle body front side of the exhaust opening 35 and the radiator 39. This ensures that the airflow which is unable to pass through the radiator 39 located in the transverse directional center but is changed in the flowing course to the transverse-directionally outer side and which passes on the outside of the cowling can be rectified by the cover member 70 to flow smoothly toward the vehicle body rear side. Particularly, since a front edge 70f of the cover member 70 is located on the vehicle body front side relative to front edges 28b of the side cowls 28, more of the airflow changed in the flowing course to the transverse-directionally outer side is easily received. In addition, since the cover member 70 is disposed on the vehicle body front side of the exhaust opening 35, the airflow rectified by the cover member 70 joins the airflow exhausted via the exhaust opening 35, to flow smoothly toward the vehicle body rear side.

Figure 6:
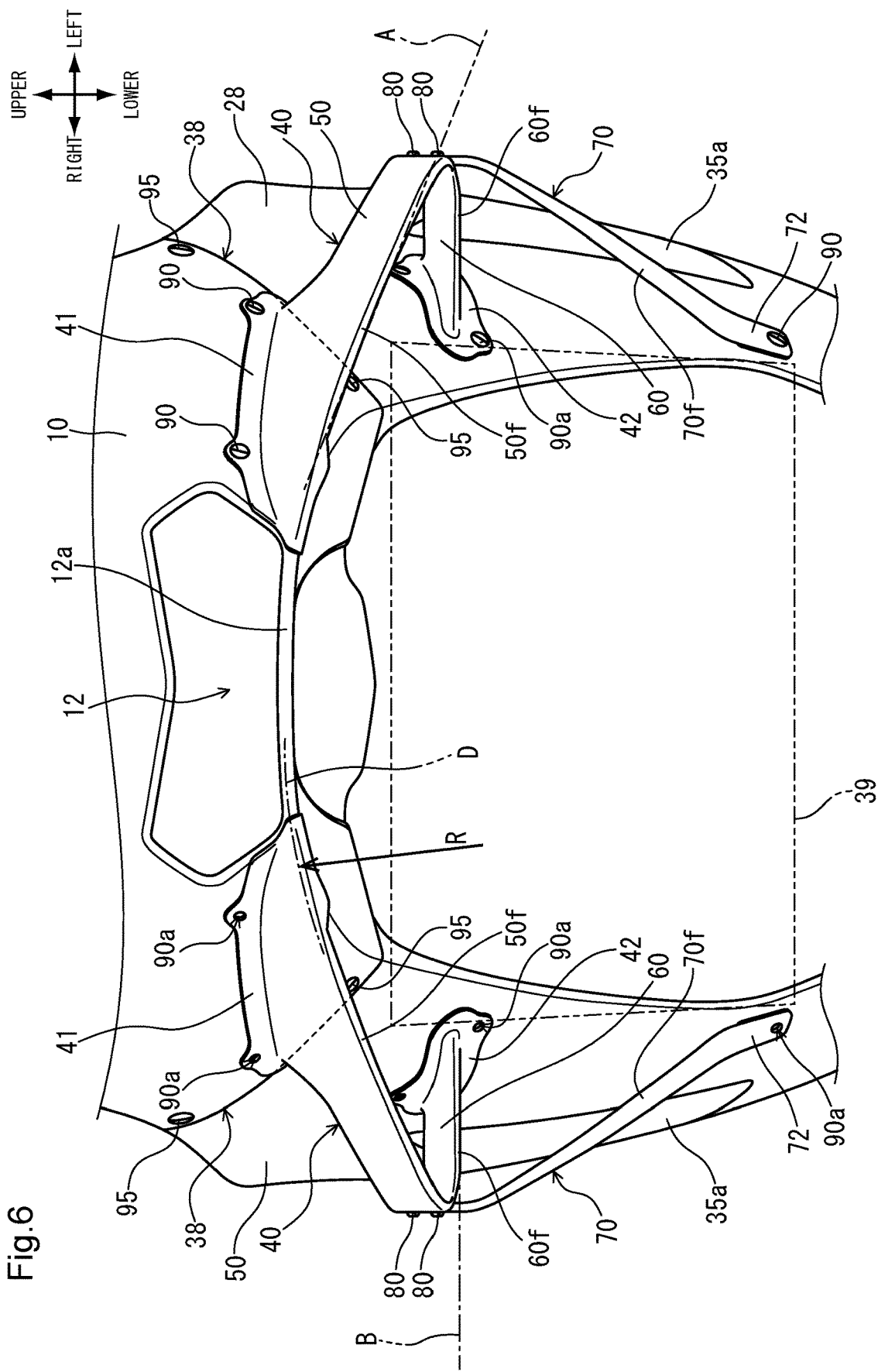
FIG. 6 is an enlarged front view illustrating the wing member and its peripheral structure.
Figure 7:
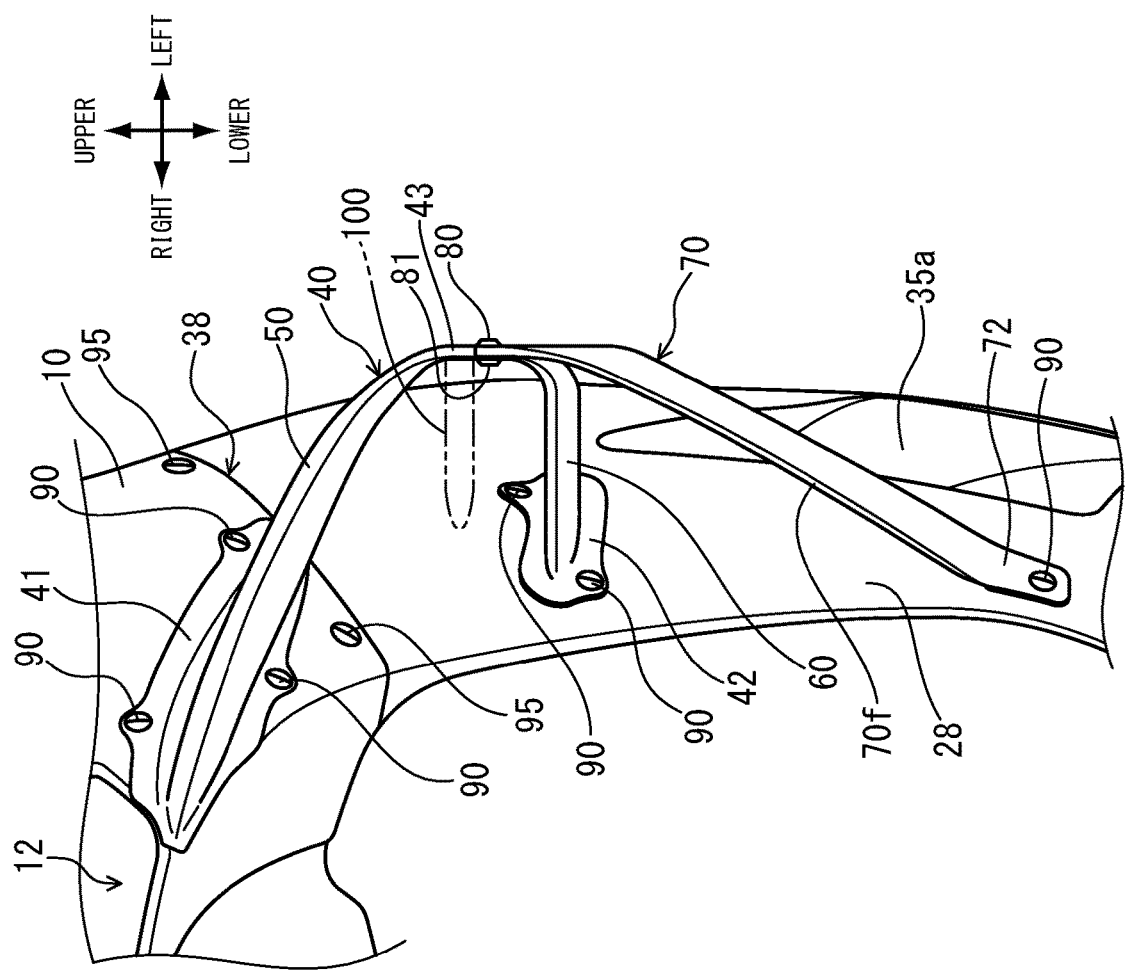
FIG. 7 is an enlarged front view of the wing member on the transverse-directionally left side.

FIG. 6 is an enlarged front view illustrating the wing member 40 and its peripheral structure. Besides, FIG. 7 is an enlarged front view of the wing member 40 on the transverse-directionally left side. FIG. 7 depicts a state as viewed from a vehicle body lower side as compared to FIG. 6. The wing member 40 has the rear-side attachment section 42 disposed at a position on the vehicle body rear lower side and the transverse-directionally outer side of the front-side attachment section 41. As a result, the second wing 60 is located at a position on the transverse-directionally outer side and the lower side of the first wing 50, in front view of the vehicle body, so that an aerodynamic effect such as a down force can be obtained by the wings on the front and rear sides.

FIG. 6 illustrates a straight line A along the front edge 50f of the first wing 50, and a straight line B along a front edge 60f of the second wing 60. As indicated by the straight line A, the front edge 50f of the first wing 50 is inclined such that its transverse-directionally outer side portion is located on the vehicle body lower side than its transverse-directionally inner side portion, in front view of the vehicle body. As a result, by providing the first wing 50 with a cathedral angle of a wing of an airplane, a force in a direction for further deepening the bank angle can be obtained when the motorcycle 1 banks for cornering. The cathedral angle of the first wing 50 can be set to a value of less than 30 degrees relative to the horizontal direction. On the other hand, as indicated by the straight line B, the front edge 60f of the second wing 60 is oriented in a substantially horizontal direction, in front view of the vehicle body. As a result, by setting the cathedral angle of the second wing 60 to roughly zero, only a function of increasing a down force can be obtained.

In addition, the front edge 50f of the wing member 40 is formed to be roughly along an arc D of a circle having a radius R and having a center at the grounding point O of the front wheel WF, in front view of the vehicle body. It is possible to reduce air resistance generated by the first wing when the vehicle body is banked to the left or the right. This ensures that a feeling of resistance due to air resistance is not liable to be generated even in the case where the speed of banking to the left or the right is high.

Further, the front edge 50f of the first wing 50 is configured to be along an extension line of a lower edge 12a of the exhaust opening 12, in front view of the vehicle body. This ensures that where an edge portion for dividing the airflow coming from the vehicle body front side into upper and lower portions is made to be integral over the range from the lower edge 12a of the exhaust opening 12 to the front edge 50f of the first wing 50, it is thereby possible to restrain the airflow from being disturbed.

Referring to FIG. 7, the airfoil section or the flat plate-shaped section of the first wing 50 and the second wing 60 are both inclined rearwardly upward, which ensures that a down force is generated by airflow. In addition, the section of the cover member 70 is inclined such as to be located on the transverse-directionally outer side in going from the front edge 70f on the vehicle body front side toward the vehicle body rear side.

The wing member 40 may be provided with a third wing 100 (alternate long and two short dashes line in the drawing) by utilizing a space between the first wing 50 and the second wing 60, in front view of the vehicle body. The third wing 100 can be attached to, for example, a transverse-directionally inner side surface of the connection section 43, whereby a stronger aerodynamic effect can be obtained.

Figure 8:
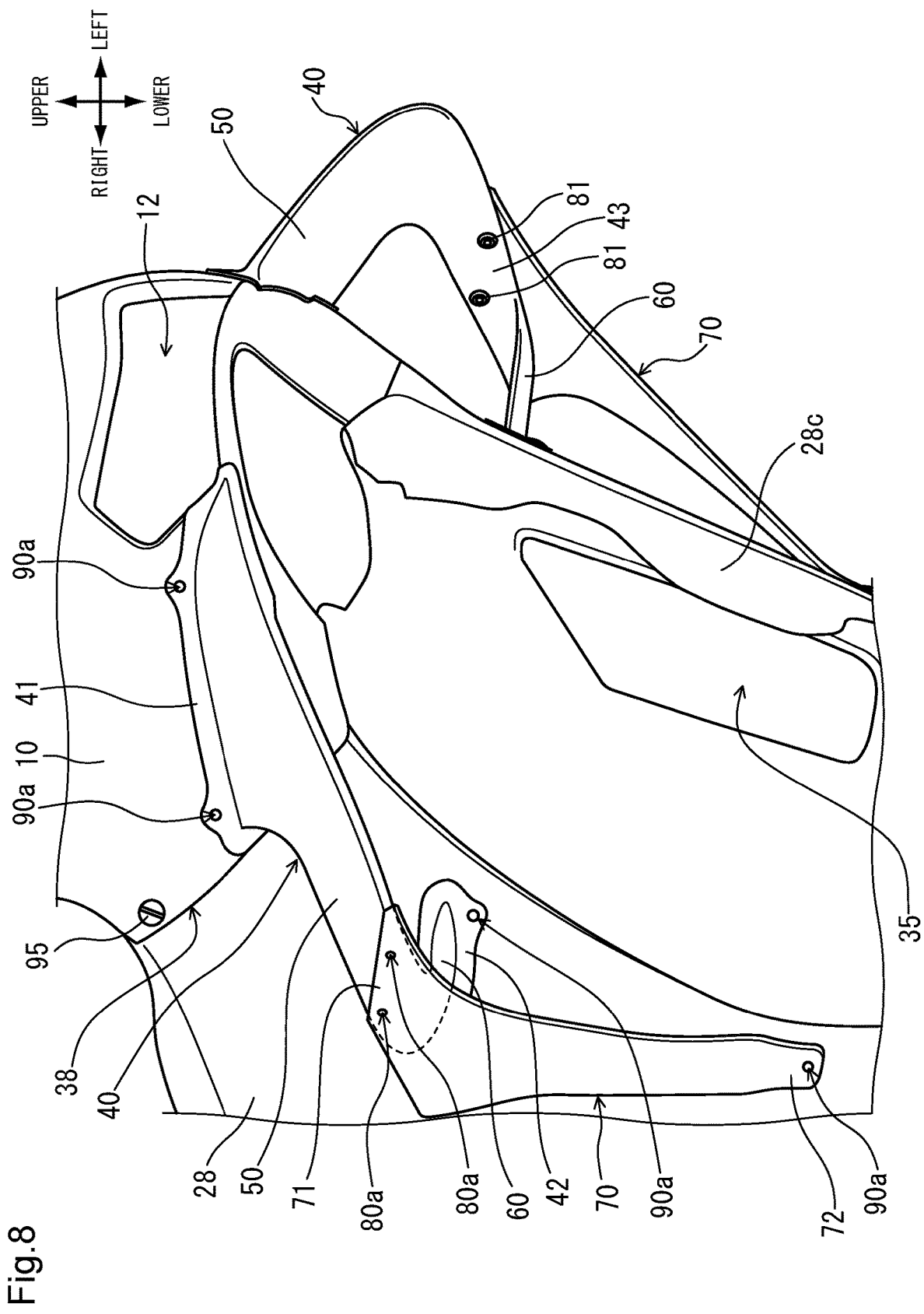
FIG. 8 is a perspective view of the wing member and its peripheral structure, as viewed from a vehicle body right front side.
Figure 9:
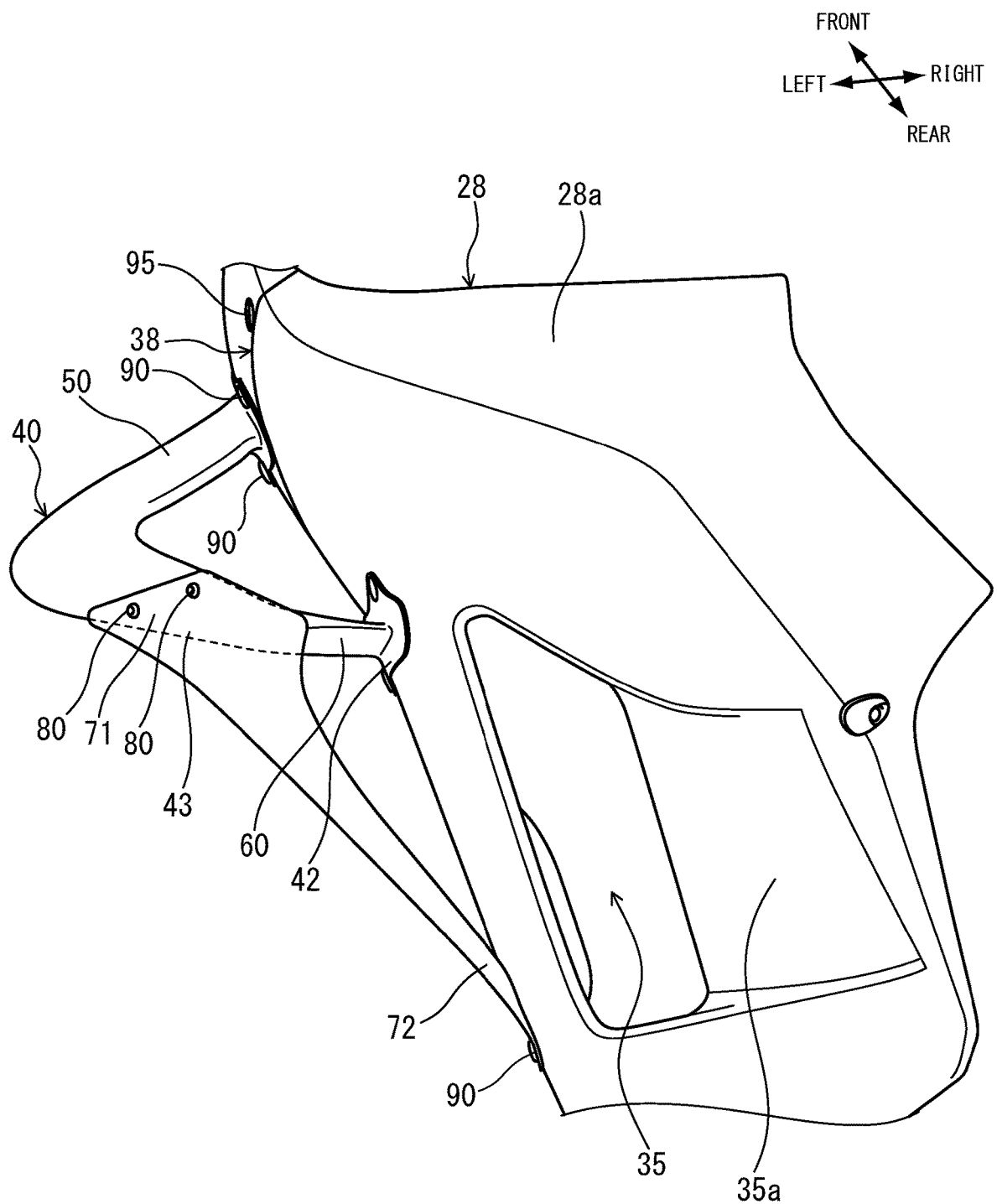
FIG. 9 is a perspective view of the wing member on the transverse-directionally left side and its peripheral structure, as viewed from a vehicle body left rear side.

FIG. 8 is a perspective view of the wing member 40 and its peripheral structure, as viewed from a vehicle body right front side. Besides, FIG. 9 is a perspective view of the wing member 40 on the transverse-directionally left side and its peripheral structure, as viewed from a vehicle body left rear side. In the present embodiment, the front-side attachment section 41 provided on the other end side of the first wing 50 is attached to the front cowl 10, and the rear-side attachment section 42 provided on the other end side of the second wing 60 is attached to the side cowl 28. Therefore, the wing member 40 is attached in a crossing manner between the front cowl 10 and the side cowl 28, whereby connection rigidity between the two cowls can be enhanced. In addition, since the cowling is divided into front and rear portions, maintainability can be enhanced. The front-side attachment section 41, the rear-side attachment section 42, and the lower end portion 72 of the cover member 70 are respectively formed with through-holes 90a in which the lock members 90 are inserted and passed.

A folded portion 28c folded to the vehicle body inner side is formed at a vehicle body front side end portion of the side cowl 28. The folded portion 28c functions as an air guide plate by which airflow introduced from the vehicle body front side is guided to pass through the radiator 39.

The front edge 50f of the first wing 50 and the front edge 70f of the cover member 70 are in the form of curves interconnected smoothly, such that air resistance is thereby reduced and that no acute angle part is present on the vehicle body front side. A through-hole 80a in which the fastening member 80 is inserted and passed is formed in the upper end portion 71 of the cover member 70, and a bulging portion 81 in which a female-side fastening member for engagement with the fastening member 80 is embedded is provided at a transverse-directionally inner side surface of the connection section 43.

Figure 10:
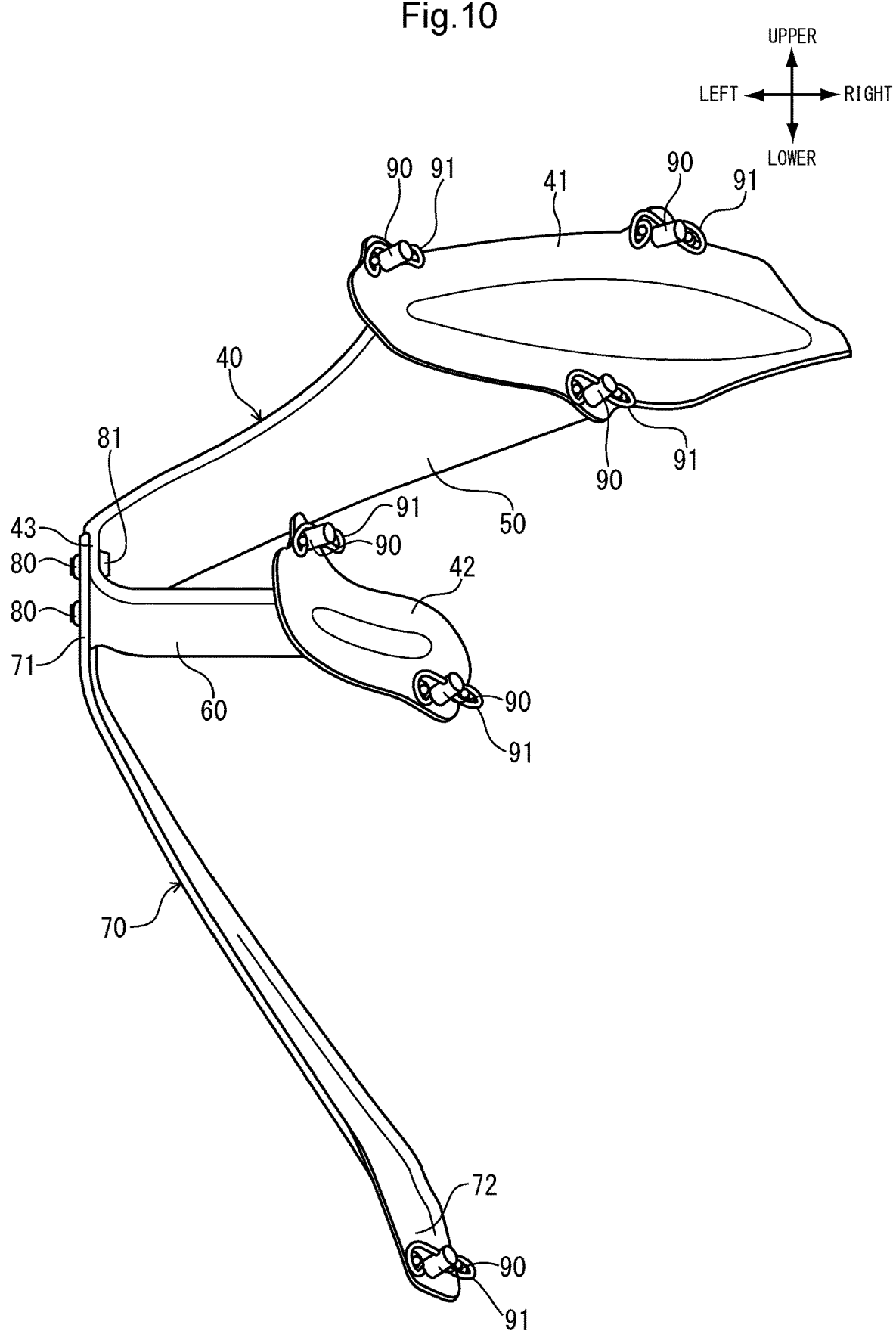
FIG. 10 is a back elevation of the wing member on the transverse-directionally left side and the cover member.
Figure 11:
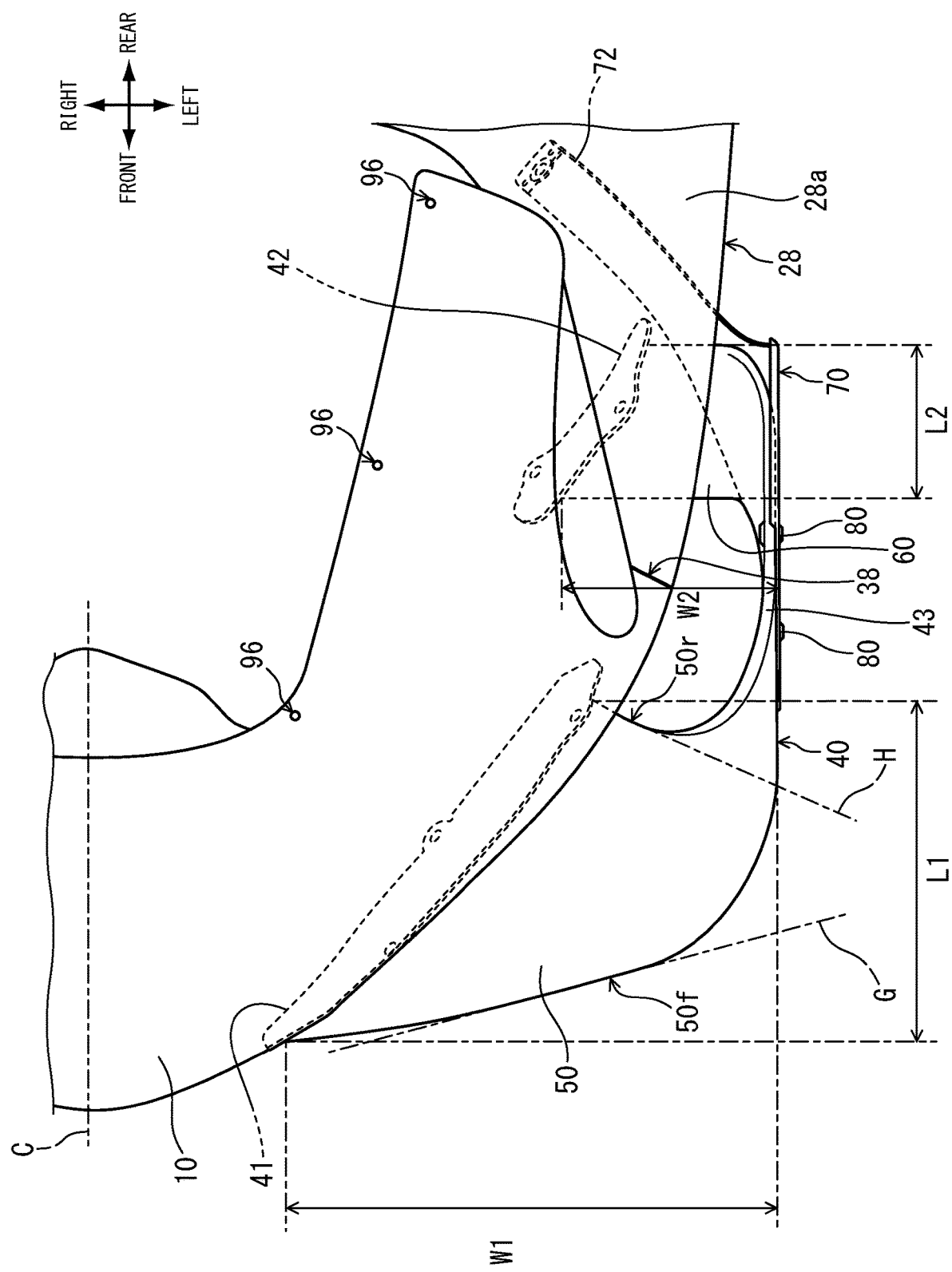
FIG. 11 is a plan view of the wing member on the transverse-directionally left side and its peripheral structure.
Figure 12:
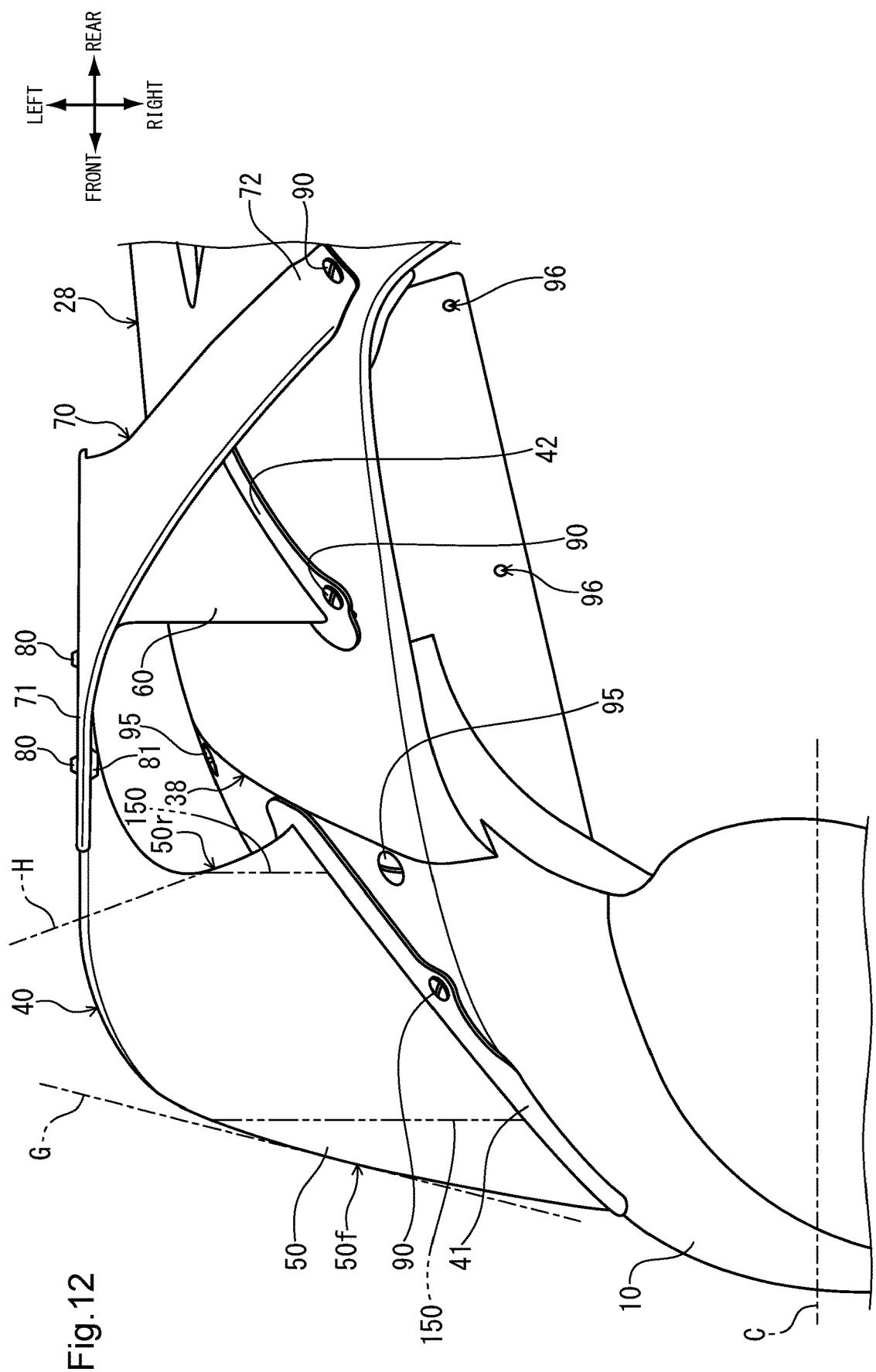
FIG. 12 is a bottom view of the wing member on the transverse-directionally left side and its peripheral structure.

FIG. 10 is a back elevation of the wing member 40 on the transverse-directionally left side and the cover member 70. Besides, FIG. 11 is a plan view of the wing member 40 on the transverse-directionally left side and its peripheral structure, and FIG. 12 is a bottom view of the wing member 40 on the transverse-directionally left side and its peripheral structure. In FIGS. 11 and 12, a vehicle body center line C is described, and a state in which the windscreen 7 is detached and attachment holes 96 are exposed is illustrated.

In the wing member 40 according to the present embodiment, the first wing 50 having a roughly airfoil section gradually decreasing in the longitudinal vehicle directional size and thickness in going toward the transverse-directionally outer side, the second wing 60 having a flat plate-like section in which the longitudinal vehicle directional size and thickness are constant in the transverse direction, and the connection section 43 having a flat plate-like section in which a flat surface portion is oriented in the transverse direction are integrally formed from a fiber reinforced resin, whereby high strength and light weight are both realized. The front-side attachment section 41 and the rear-side attachment section 42 are in thin sheet shapes curved in conformity with the surface shapes of the front cowl 10 and the side cowls 28, respectively, and they are attached to the cowling together with the lower end portion 72 of the cover member 70 by quick fastener mechanisms using the lock members 90 and springs 91. As a result, the wing member 40 and the cover member 70 in a sub-assembled state can be attached to and detached from the cowling.

In FIGS. 11 and 12, a straight line G as a tangent to a substantially central portion of the front edge 50f of the first wing 50 and a straight line H as a tangent to a substantially central portion of a rear edge 50r of the first wing 50 are depicted. As indicated by the straight line G, the front edge 50f of the first wing 50 is inclined such that its transverse-directionally outer side portion is located on the vehicle body rear side relative to its transverse-directionally inner side portion. In addition, as indicated by the straight line H, the rear edge 50r of the first wing 50 is inclined such that its transverse-directionally outer side portion is located on the vehicle body front side relative to its transverse-directionally inner side portion. With the front edge 50f and the rear edge 50r of the first wing 50 thus inclined, the first wing 50 is shaped such that its surface area increases in going toward the transverse-directionally inner side, the longitudinal vehicle directional length and the surface area of the first wing 50 can be enlarged, and the aerodynamic effect can be enhanced, as compared to a related-art wing 150 indicated by alternate long and two short dashes line in the drawing in which the front edge and the rear edge of the wing are parallel to each other. In addition, the area of the part connected to the cowling can be easily enlarged, and support rigidity of the wing can be enhanced. Further, the front edge 50f has a sweep-back angle of the wing of an airplane, whereby a higher aerodynamic effect is easily generated at the time of high-speed running.

In addition, a transverse directional size W1 of the first wing 50 is greater than a transverse directional size W2 of the second wing 60, and the longitudinal vehicle directional size L1 of the first wing 50 is greater than the longitudinal vehicle directional size L2 of the second wing 60, whereby the first wing 50 located on the vehicle body front side is enlarged in size and the aerodynamic effect is enhanced thereby. Besides, since the vehicle body front side of the front cowl 10 is shaped in such a manner that its transverse directional size increases in going rearward from the vehicle body front side end portion, and, with the first wing 50 shaped in conformity with this, the amount of projection of the wing member 40 to the transverse-directionally outer side can be reduced while obtaining a sufficient aerodynamic effect.

Figure 13:
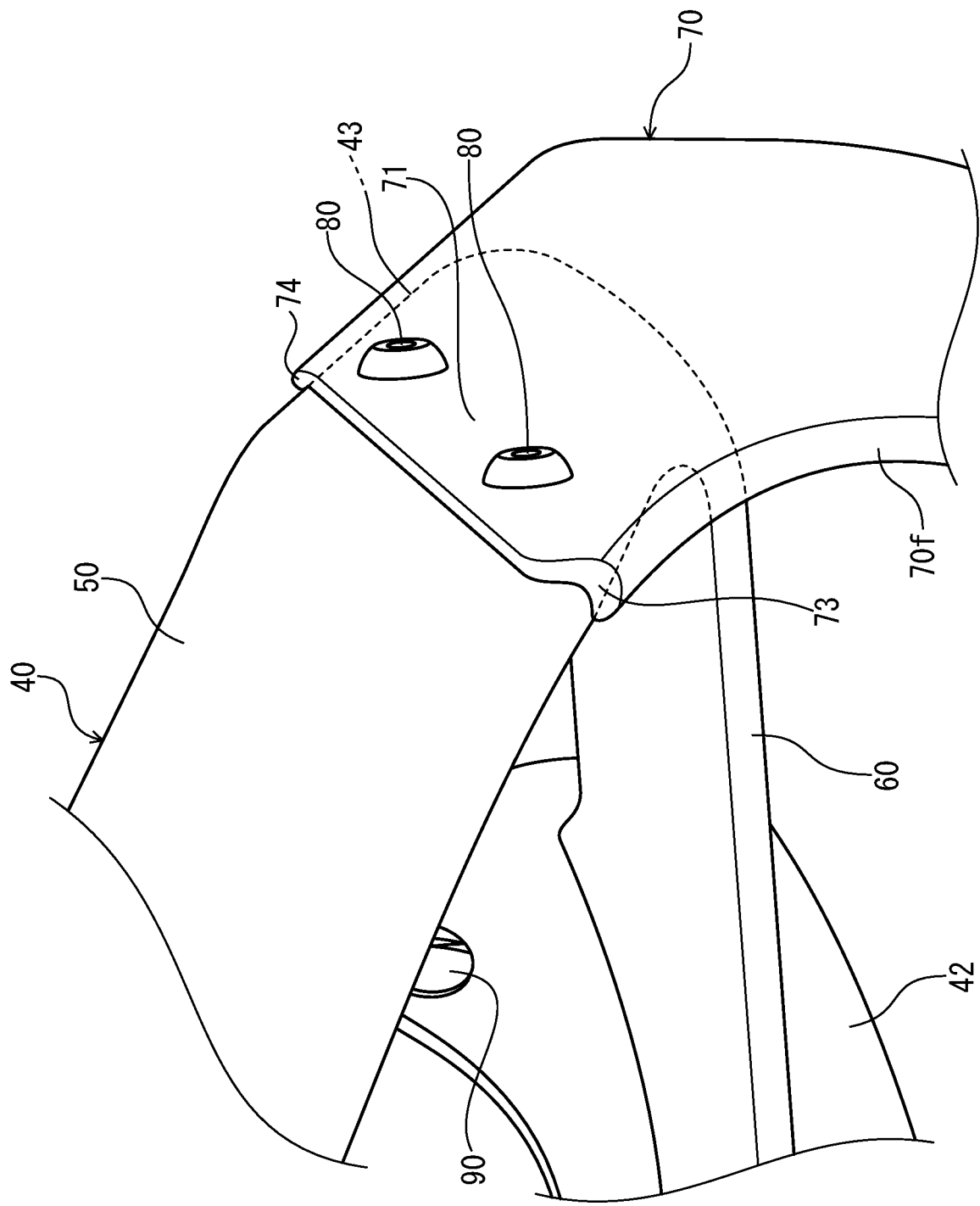
FIG. 13 is an enlarged perspective view of a joint portion between the wing member and the cover member.
Figure 14:
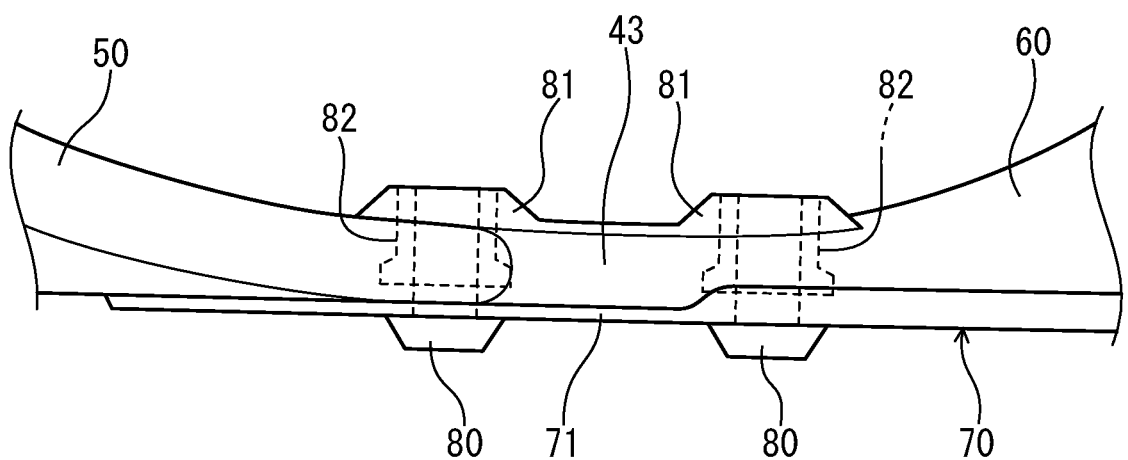
FIG. 14 is an enlarged plan view of the joint portion between the wing member and the cover member.
Figure 14:
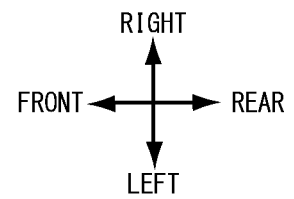

FIG. 13 is an enlarged perspective view of a joint portion between the wing member 40 and the cover member 70. FIG. 14 is an enlarged plan view of the joint portion between the wing member 40 and the cover member 70. The cover member 70 has a thin sheet shape similarly to the front-side attachment section 41 and the rear-side attachment section 42 of the wing member 40. The front edge 70f and a rear edge of the cover member 70 are rounded such as to cover upper and lower edges of the connection section 43, whereby bending strength is enhanced and positioning relative to the connection section 43 is facilitated. Further, an upper end portion 73 of the front edge 70f and an upper end portion 74 of the rear edge are chamfered to reduce air resistance due to airflow.

Referring to FIG. 14, the fastening members 80 for fixing the cover member 70 to the connection section 43 may be, for example, bolts having a cheese type head portion provided with a hexagonal hole. The fastening member 80 passes through the through-hole 80a in the cover member 70, and is engaged with a female-side fastening member 82 embedded in the connection section 43. The female-side fastening member 82 may be, for example, a flanged nut which is insert-molded onto the connection section 43. The bulging portion 81 which is formed on the transverse-directionally inner side of the connection section 43 and is trapezoidal in shape in plan view of the vehicle body makes it possible to restrain disturbance and air resistance of the airflow passing along the inner side surface of the connection section 43, as compared to a configuration in which the female-side fastening member is exposed at the transverse-directionally inner side surface of the connection section 43, while securing a sufficient female screw length and enhancing fastening rigidity.

Note that the form of the saddled motor driven vehicle, the shape and structure of the front cowl and the side cowls, the shape and structure of the wing member, the shape and structure of the cover member, the structure of attaching the wing member to the cowling, the configurations of the fastening member and the female-side fastening member, etc. are not limited to those in the above embodiment, and various modifications are possible. The wing member according to the present invention is applicable not only to sport-type motorcycles, but also to saddled vehicles such as a scooter-type vehicle, a motor-driven two-wheeled vehicle, and a three-wheeled vehicle having two front wheels or two rear wheels.

REFERENCE SIGNS LIST

1 . . . Motorcycle (Saddled vehicle),
10 . . . Front cowl (cowling),
10a . . . Lower edge,
12 . . . Intake opening,
12a . . . Lower edge,
28 . . . Side cowl (cowling),
35 . . . Exhaust opening,
39 . . . Radiator,
40 . . . Wing member,
41 . . . Front-side attachment section,
42 . . . Rear-side attachment section, 43 ... Connection section,
50 ... First wing,
50f ... Front edge of the first wing,
50r ... Rear edge of the first wing,
60 ... Second wing,
60f ... Front edge of the second wing,
70 ... Cover member (other part),
71 ... Upper end portion,
72 ... Lower end portion,
81 ... Bulging portion,
82 ... Fixing member,
D ... Arc,
E ... Engine,
W1 ... Transverse directional size of the first wing,
W2 ... Transverse directional size of the second wing,
L1 ... Longitudinal vehicle directional size of the first wing,
L2 ... Longitudinal vehicle directional size of the second wing,
O ... Grounding point,
WF ... Front wheel,

The invention claimed is:

1. A saddled vehicle comprising:
a cowling covering a front side and lateral sides of a vehicle body; and
a wing member attached to an outer side of the cowling,
wherein the wing member includes a first wing, a second wing, and a connection section connecting one-end sides of the first wing and the second wing,
wherein the first wing and the second wing are disposed with a spacing therebetween in a longitudinal vehicle direction,
wherein the first wing is located on a vehicle body front upper side relative to the second wing,
wherein the connection section connects the one-end sides of the first wing and the second wing that extend from the cowling toward a transverse-directionally outer side,
wherein a front edge of the first wing is inclined such that its transverse-directionally outer side portion is located on a vehicle body rear side relative to its transverse-directionally inner side portion, in plan view of the vehicle body,
wherein a rear edge of the first wing is inclined such that its transverse-directionally outer side portion is located on a vehicle body front side relative to its transverse-directionally inner side portion, in plan view of the vehicle body,
wherein the connection section is used as an attachment section attaching an other part,
wherein the other part is a cover member extending toward a vehicle body rear lower side while covering the connection section and the second wing in side view of the vehicle body,
wherein an upper end portion of the cover member is attached to the connection section, and
wherein a lower end portion of the cover member is attached to the cowling at a position on a vehicle body lower side of the second wing.

2. The saddled vehicle according to claim 1, wherein a transverse-directionally inner side surface of the connection section is provided with a bulging portion for embedding a fixing member for fixing the cover member.

3. The saddled vehicle according to claim 2, wherein the cowling covers at least transverse-directionally outer sides of an engine and a radiator disposed on a vehicle body front side of the engine,
wherein the cowling is formed with an exhaust opening for exhausting airflow having passed through the radiator to a transverse-directionally outer side of the cowling, and
wherein the cover member is disposed on a vehicle body front side of the exhaust opening.

4. The saddled vehicle according to claim 2, wherein the wing member is provided as a pair of left and right wing members in the transverse direction,
wherein the front edge of the first wing is inclined such that its transverse-directionally outer side portion is located on a vehicle body lower side relative to its transverse-directionally inner side portion, in front view of the vehicle body, and
wherein a front edge of the second wing is oriented in a substantially horizontal direction in front view of the vehicle body.

5. The saddled vehicle according to claim 2, wherein a transverse directional size of the first wing is greater than a transverse directional size of the second wing, and
wherein a longitudinal vehicle directional size of the first wing is greater than a longitudinal vehicle directional size of the second wing.

6. The saddled vehicle according to claim 1, wherein the cowling covers at least transverse-directionally outer sides of an engine and a radiator disposed on a vehicle body front side of the engine,
wherein the cowling is formed with an exhaust opening for exhausting airflow having passed through the radiator to a transverse-directionally outer side of the cowling, and
wherein the cover member is disposed on a vehicle body front side of the exhaust opening.

7. The saddled vehicle according to claim 6, wherein the wing member is provided as a pair of left and right wing members in the transverse direction,
wherein the front edge of the first wing is inclined such that its transverse-directionally outer side portion is located on a vehicle body lower side relative to its transverse-directionally inner side portion, in front view of the vehicle body, and
wherein a front edge of the second wing is oriented in a substantially horizontal direction in front view of the vehicle body.

8. The saddled vehicle according to claim 6, wherein a transverse directional size of the first wing is greater than a transverse directional size of the second wing, and
wherein a longitudinal vehicle directional size of the first wing is greater than a longitudinal vehicle directional size of the second wing.

9. The saddled vehicle according to claim 1, wherein the wing member is provided as a pair of left and right wing members in the transverse direction,
wherein the front edge of the first wing is inclined such that its transverse-directionally outer side portion is located on a vehicle body lower side relative to its transverse-directionally inner side portion, in front view of the vehicle body, and
wherein a front edge of the second wing is oriented in a substantially horizontal direction in front view of the vehicle body.

10. The saddled vehicle according to claim 9, wherein the front edge of the first wing has a shape along an arc of a circle having a center at a grounding point of a front wheel of the saddled vehicle, in front view of the vehicle body.

11. The saddled vehicle according to claim 1, wherein a transverse directional size of the first wing is greater than a transverse directional size of the second wing, and
   wherein a longitudinal vehicle directional size of the first wing is greater than a longitudinal vehicle directional size of the second wing.

12. A saddled vehicle comprising:
   a cowling covering a front side and lateral sides of a vehicle body; and
   a wing member attached to an outer side of the cowling,
   wherein the wing member includes a first wing, a second wing, and a connection section connecting one-end sides of the first wing and the second wing,
   wherein the first wing and the second wing are disposed with a spacing therebetween in a longitudinal vehicle direction,
   wherein the first wing is located on a vehicle body front upper side relative to the second wing,
   wherein the connection section connects the one-end sides of the first wing and the second wing that extend from the cowling toward a transverse-directionally outer side,
   wherein a front edge of the first wing is inclined such that its transverse-directionally outer side portion is located on a vehicle body rear side relative to its transverse-directionally inner side portion, in plan view of the vehicle body,
   wherein a rear edge of the first wing is inclined such that its transverse-directionally outer side portion is located on a vehicle body front side relative to its transverse-directionally inner side portion, in plan view of the vehicle body,
   wherein the cowling includes a front cowl covering a vehicle body front side, and a pair of left and right side cowls connected to a rear end portion of the front cowl, and
   wherein a front-side attachment section provided on an other end side of the first wing is attached to the front cowl, and a rear-side attachment section provided on an other end side of the second wing is attached to the side cowl.

13. The saddled vehicle according to claim 12, wherein the front edge of the first wing is located on a vehicle body lower side relative to a lower edge of the front cowl, in side view of the vehicle body.

14. The saddled vehicle according to claim 12, wherein an intake opening for guiding in airflow is formed at a vehicle body front side end portion of the front cowl, and
   wherein the front edge of the first wing is along an extension line of a lower edge of the intake opening, in front view of the vehicle body.

* * * * *